(12) United States Patent
Shoykhet et al.

(10) Patent No.: US 11,808,742 B2
(45) Date of Patent: Nov. 7, 2023

(54) MULTI-DIMENSIONAL LIQUID CHROMATOGRAPHY WITH SECOND DIMENSION HAVING A VARIABLE FLOW RATE

(71) Applicant: Agilent Technologies, Inc., Santa Clara, CA (US)

(72) Inventors: Konstantin Shoykhet, Karlsruhe (DE); Stephan Buckenmaier, Ettlingen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 156 days.

(21) Appl. No.: 17/446,096

(22) Filed: Aug. 26, 2021

(65) Prior Publication Data

US 2022/0065827 A1    Mar. 3, 2022

(30) Foreign Application Priority Data

Aug. 26, 2020   (GB) ...................................... 2013339

(51) Int. Cl.
  *G01N 30/46*  (2006.01)
  *G01N 30/14*  (2006.01)
  (Continued)

(52) U.S. Cl.
  CPC ............. *G01N 30/46* (2013.01); *G01N 30/14* (2013.01); *G01N 30/32* (2013.01);
  (Continued)

(58) Field of Classification Search
  CPC ........ G01N 30/14; G01N 30/32; G01N 30/46; G01N 30/463; G01N 2030/027; G01N 2030/324; G01N 2030/326
  See application file for complete search history.

(56) References Cited

U.S. PATENT DOCUMENTS 5,196,039 A * 3/1993 Phillips ................ G01N 30/463
                                                          95/82
9,694,301 B2 * 7/2017 Choikhet ............... G01N 30/72
(Continued)

FOREIGN PATENT DOCUMENTS

DE      102008044072 A1    4/2009
DE      102013212540 A1   12/2014
(Continued)

OTHER PUBLICATIONS

Pirok et al. "Optimizing separations in online comprehensive two-dimensional liquid chromatography," Journal of Separation Science, vol. 41, No. 1, pp. 68-98 (Year: 2018).*
(Continued)

*Primary Examiner* — John Fitzgerald

(57) ABSTRACT

A multi-dimensional liquid chromatography system includes first and second liquid chromatography systems. The first system is configured for providing a first chromatographic separation of a sample fluid comprised in a first mobile phase and to provide a first effluent including at least a portion of the separated sample fluid. The second system is configured for providing a second chromatographic separation of at least a portion of the first effluent comprised in a second mobile phase. A control unit is configured to operate
(Continued)

the first liquid chromatography system by maintaining a first flow rate of the first mobile phase substantially constant during the first chromatographic separation, and to operate the second liquid chromatography system during the second chromatographic separation according to a control value different from the second flow rate, so that a variation in the control value can lead to a variation in the second flow rate.

16 Claims, 4 Drawing Sheets

(51) Int. Cl.
*G01N 30/32* (2006.01)
*G01N 30/02* (2006.01)

(52) U.S. Cl.
CPC . *G01N 2030/027* (2013.01); *G01N 2030/324* (2013.01); *G01N 2030/326* (2013.01)

(56) References Cited

U.S. PATENT DOCUMENTS

| | | | | |
|---|---|---|---|---|
| 10,478,749 | B2* | 11/2019 | Wikfors | ........... G01N 30/32 |
| 2015/0122655 | A1* | 5/2015 | Choikhet | ............ G01N 30/465 204/600 |
| 2016/0334031 | A1 | 11/2016 | Shoykhet et al. | |
| 2017/0343520 | A1 | 11/2017 | Ortmann et al. | |
| 2021/0223216 | A1* | 7/2021 | Stoll | ................ G01N 30/32 |
| 2022/0283129 | A1* | 9/2022 | Stoll | ................ G01N 30/463 |
| 2023/0039500 | A1* | 2/2023 | Buckenmaier | ..... B01D 15/1878 |

FOREIGN PATENT DOCUMENTS

| | | | | |
|---|---|---|---|---|
| EP | 2581741 | A1 | 4/2013 | |
| EP | 3032253 | A1 | 6/2016 | |
| EP | 2491993 | B1 * | 10/2018 | ......... B01D 15/1878 |
| WO | 2009062538 | A1 | 5/2009 | |
| WO | 2013167193 | A1 | 11/2013 | |
| WO | 2016016740 | A1 | 2/2016 | |

OTHER PUBLICATIONS

Talus et al. "Effect of pressure pulses at the interface valve on the stability of second dimension columns in online comprehensive two-dimensional liquid chromatography," Journal of Chromatography A, 1378, pp. 50-57 (Year: 2015).*
Verstaeten et al. "Comparison of the quantitative performance of constant pressure versus constant flow rate gradient elution separations using concentration-sensitive detectors," Journal of Chromatography A, 1232, pp. 65-76 (Year: 2012).*
Combined Search and Examination Report under Sections 17 and 18(3) dated Feb. 18, 2021 for application No. GB 2013339.3; 5 pages.

* cited by examiner

MULTI-DIMENSIONAL LIQUID CHROMATOGRAPHY WITH SECOND DIMENSION HAVING A VARIABLE FLOW RATE

RELATED APPLICATIONS

This application claims priority to UK Application No. GB 2013339.3, filed Aug. 26, 2020, the entire contents of which are incorporated herein by reference.

TECHNICAL FIELD

The present invention relates to multidimensional liquid chromatography.

BACKGROUND

In liquid chromatography ("LC"), a fluidic sample and an eluent (liquid mobile phase) may be pumped through conduits and a column in which separation of sample components takes place. The column may comprise a material which is capable of separating different components of the fluidic sample. Such a packing material, so-called beads which may comprise silica gel, may be filled into a column tube which may be connected to other system elements (like a sampler, a detector) by conduits.

The composition of the mobile phase can be adjusted by composing the mobile phase from different fluidic components with variable contributions, so called gradient mode. High performance liquid chromatography ("HPLC") systems often are operated in such gradient mode, wherein for instance for reversed phase chromatography the organic content is ramped over time, or for ion exchange chromatography the salt content is ramped over time. Especially in peptide or protein analysis many applications are based on water/acetonitrile gradients. An analytical protocol for running a defined analytical process is called the "method". In the analytical protocol—or method—for a gradient separation, the gradient is usually defined as a composition change program over time, while the flow rate may be kept constant. The so-called retention time is a time required for transport of a certain component of a fluidic sample to be separated throughout a separation column during a separation run.

Two-dimensional separation of a fluidic sample denotes a separation technique in which a first separation procedure (typically in a first separation unit such as a first chromatographic column) is performed to separate a fluidic sample into a plurality of fractions, and in which a subsequent second separation procedure (typically in a second separation unit such as a second chromatographic column) is performed to further separate at least one of the plurality of fractions into sub-fractions. Two-dimensional liquid chromatography (2D-LC) may combine two liquid chromatography separation techniques and plot the time dependency of detection events along two orthogonal time axes.

Multi-dimensional liquid chromatography applies two or more chromatographic separations to a sample fluid in order to provide higher resolution of the separated fractions. The two or more chromatographic separations are typically selected to be more or less orthogonal to each other, as readily known in the art.

One- or multi-dimensional LC separation is typically performed in a time-based control scheme, i.e. a flow rate (in each LC dimension) is kept substantially constant or following a predefined program, and so-called retention times are determined as a time for a respective fraction to be eluted from a chromatographic column.

WO2009062538A1, by the same applicant, teaches to provide the liquid separation with a volume-based control scheme. Instead of retention times, a so-called retention volume is determined as a respective volume of a solvent required to elute a respective fraction from a chromatographic column. WO2009062538A1 is incorporated by reference herein in its entirety.

WO2013167193A1, by the same applicant, discloses a so-called tandem-LC system wherein the second dimension LC is directly fluidically coupled downstream to the first dimension LC. Operation in both sample separation dimensions can be performed in either time-based or volume-based control scheme. WO2013167193A1 is incorporated by reference herein in its entirety.

SUMMARY

It is an object of the invention to provide an improved multi-dimensional liquid chromatography.

Multidimensional liquid chromatography, such as 2D-LC, is often used to solve difficult separation problems, characteristically in highly complex samples. Aliquots of effluent from a first dimension (1D) column can be transferred to a second dimension (2D) column with the goal to separate those compounds that co-eluted in first dimension. It is often routine that a single two-dimensional separation includes one chromatographic run (cycle) in the first dimension, and multiple chromatographic runs in the second separation dimension.

This can imply specific demands on the operation mode of the instrument, especially its second dimension, such as average duration of the 2D-run should or even must be shorter or much shorter than the 1 D-run. In a comprehensive application mode 2D-runs should follow in real time with respect to the first dimension, so the aliquots are conventionally taken at fixed time intervals, and each aliquot is immediately separated within a respective 2D run, whereas each 2D run should be finished within this interval to avoid sample loss. In heart cutting modes the demands on the second dimension may be less stringent due to lower number of aliquots to being analyzed and optionally available sample storage for a number of aliquots. But also in this case it can be beneficial to free the storage slots rapidly for accommodation of further aliquots and e.g. to consider that a queue of excessively long 2D-runs may stretch the total analysis duration unacceptably longer over the duration of the 1 D-run.

Executing runs (in the second dimension) with much higher frequency than the first dimension can expose the hardware constituting the second separation dimension to much greater wear and stress caused by significant pressure variations, occurring in the course of each 2D-run. Additional stress can be caused by usually high operating pressures e.g. dictated by a need to shorten the run duration as far as possible. It might thus appear for the user that durability of the hardware in the second dimension in terms of number of analyzed samples (1D-injections) is unacceptably low in comparison to conventional 1-dimensional techniques.

Embodiments of the present invention provide multidimensional liquid chromatography using variable flow rate. The second dimension in 2D-LC is routinely operated under high stress conditions for the LC hardware, and the performance and throughput potential are not completely used because of operating the system, especially the second dimension in flow controlled, typically constant flow mode. This can be overcome by operating the second dimension in variable flow, i.e. having a variable flow rate, especially by running in a constant pressure mode. This may require adjustments to the operation mode of the first dimension and coordination of the first and second dimensions.

Embodiments of the present invention provide one or more of the following advantages: reduction of the stress to the 2D-column and 2D-Hardware in general; increasing throughput in the second dimension and thus in most cases in 2D-LC separation altogether; elimination of artifacts caused by pressure variations in the second dimension; and increasing robustness by eliminating possibility of violating high pressure limit in the second dimension.

Embodiments of the present invention allow to optimize throughput, reduce hardware stress and wear, and improve robustness in the second dimension and thus to enhance the value of the 2D-LC technology altogether. This can be achieved by application and accommodation of a Volume Based approach, as e.g. disclosed in the aforementioned WO2009062538A1, to the separation in the second and maybe any further dimension.

In embodiments, a 2D-LC device is no longer operated entirely in flow-controlled mode, especially the second dimension is operated in variable flow mode, preferably in constant pressure mode. A constant pressure operation mode may allow for analysis acceleration e.g. by double-digit percent or more. Switching of the 2D-operation mode from constant flow (cF) to constant pressure (cP) can enhance throughput and enable shorter 2D-runs, addressing issues listed above.

In many 2D-LC applications, the typical injection volume into the second dimension is higher and the sample is in many cases more viscous than in conventional first dimension chromatography. Consequently, not just the 2D eluent viscosity, but rather the first-dimension effluent viscosity within one single aliquot may be causing the absolute pressure maximum in 2D. For conventional constant flow operation mode it thus defines the maximum permittable flow rate, which unnecessarily would have to be chosen low for the entire analysis, i.e. all 2D-runs. The constant pressure operation mode may intrinsically resolve this kind of limitations by allowing to automatically adjust the flow rate every moment to the maximum, possible under the given pressure limit.

In preferred embodiments applying constant pressure operation mode in the second dimension, pressure changes in the second dimension caused e.g. by viscosity changes of various origin can be automatically eliminated. This may reduce stress for the system and especially for the LC column and may extend its lifetime.

In preferred embodiment, system stress can be substantially reduced in constant pressure-mode (in the second dimension), if the throughput achievable in conventional constant flow mode is sufficient. In this case the operating pressure for constant pressure operation may be selected such that the average second dimension flow rate throughout the analysis is maintained essentially the same as it was in the constant flow mode, thus the total duration of all 2D runs is approximately equal to that achieved in conventional constant flow mode. However, in this case the constant pressure persistently present in 2D may be significantly lower than pressure maxima experienced regularly and periodically in the constant flow-mode. Thus constant pressure operation additionally may reduce system stress.

Robustness can be increased by elimination of possibility of hitting the high-pressure limit in pressure-controlled operation mode.

Precision of operation can be increased in constant pressure mode, because composition artifacts, invoked by pressure fluctuations can be eliminated by the root cause, e.g. as described in DE102008044072A1 by the same applicant. DE102008044072A1 is incorporated by reference herein in its entirety.

In one embodiment, separation in the second dimension is operated in variable flow mode. Preferably, it is operated in constant pressure mode. This may shorten the 2D-runs, but the exact execution time may not be predictable, thus in the operation modes with time-critical 2D-injection points, the time slot reserved for each 2D run can be calculated with some headspace, which in total may still be way shorter than its duration in the constant flow-mode.

Preferably the 2D-pressure is maintained between the 2D-runs for stress-reduction reasons. In non-time-critical modes (e.g. multi-heart cutting MHC with sufficient "parking capacity" to temporarily store the effluent (which may be also referred to as "eluate") or parts thereof from the first dimension) the 2D-injections may occur in "live queue".

In embodiments operated in comprehensive mode, it is possible either to take aliquots at fixed points in time (e.g. equidistantly) and provide needed headspace in the time slot for 2D-run as described above, or to take/inject aliquots according to the 2D-readiness. In the latter case injection volumes and under circumstanced sample transfer volume may vary. However, the resulting variations of injected amounts and aliquot transfer times can be predictable or traceable and can thus be accounted for by the data evaluation engine (e.g. by normalizing the amounts per aliquot by the sample volume).

Still another embodiment may comprise coupling of the second dimension and first dimension flow rates. In an embodiment, the flow rate in the first dimension is operated to be substantially constant during the intervals, when the second dimension might be inactive, and volume-based flow controlled variable flow mode may be applied in the first dimension, during the second dimension executes separation runs. The variable flow rate in the first dimension may depend on the actually present second dimension flow. More specifically, the flow rate in the first dimension during the active part of 1D-separation, i.e. from the injection until the last aliquot of interest is sampled, may be controlled as a function of the 2D-flow rate.

In an embodiment, (during second dimension is active) the first-dimension flow rate is controlled to be at every time directly proportional to the second-dimension flow rate, which in turn can be governed by the pressure control in 2D. In this embodiment the elution volumes of the analytes in the first dimension and the functional events (e.g. aliquot injections) in the second dimension get strictly linked to each other in the volume space (similarly, as it is the case in constant flow in the time space).

In another embodiment, mixed operation modes are possible. For example, 2D can be operated in "freeze Gradient" mode (e.g. as described in EP2581741A1 by the same applicant) or in a "generic limit" mode, i.e. the flow may be variable but is only reduced temporarily once the pressure reaches the defined limit; otherwise the operation may follow a flow rate program. EP2581741A1 is incorporated by reference herein in its entirety.

In embodiments, the results representation (e.g. visualization of one or plural chromatograms) may be similar to any of the established 2D-LC representation methods, however, dimensions operating in the variable flow mode are preferably presented in "chromatographic time" or volume domain.

One embodiment of the present invention is a multi-dimensional liquid chromatography system comprising a first liquid chromatography system and a second liquid chromatography system. The first liquid chromatography system is configured for providing a first chromatographic separation of a sample fluid comprised in a first mobile phase and to provide a first effluent comprising at least a portion of the separated sample fluid. The second liquid chromatography system is configured for providing a second chromatographic separation of at least a portion of the first effluent comprised in a second mobile phase. The term "comprised" as used here in the context of "in a mobile phase" shall cover: contained in, enclosed in or by, being transported by, within or as part of, or similar. A control unit is provided and configured to operate the first liquid chromatography system by maintaining a first flow rate of the first mobile phase substantially constant during the first chromatographic separation, and to operate the second liquid chromatography system during the second chromatographic separation according to a control value different from the second flow rate.

This allows that controlling, e.g. keeping constant or operating the control value according to a certain rule or program, may lead to or result in a variation in the second flow rate. In embodiments, other control parameters, such as eluent composition, temperature of functional parts of the system, wavelength, sensitivity, valve switching points, fraction collection points, etc., remain linked to run volume, i.e. to the points as pre-determined amounts of volume of the (2D) eluent are pumped since a reference event, e.g. run start, rather than being linked run time, i.e. to certain points in the time since the reference event. The term "run volume" can be understood as a value, e.g. changing from 0 to its end value in course of the run. Thus we can speak about its current or actual value at a moment in the time. Contrarily, retention volume can be understood as a characteristic of a peak or of a given analyte in the specific LC Further, this allows using and transferring separation methods as typically developed in a time based scheme for the first chromatographic separation, while the second chromatographic separation can be adjusted to better accommodate for the transfer between first and second chromatographic separation, in particular to accommodate for time constraints in such transfer by allowing to reduce the time required for executing such second chromatographic separation with respect to the retention time-based methods.

In one embodiment, the control unit is configured to operate the first liquid chromatography system in a time-based control scheme by determining a value of a retention time representing a time required to elute a respective compound of the sample fluid (at least) through a first stationary phase of the first liquid chromatography system. This allows transferability of chromatographic separation methods previously developed in such time-based control scheme.

In one embodiment, the control unit is configured to operate the second liquid chromatography system in a volume-based mode (which may also be referred to as volume-based control scheme) by determining a value of a retention volume representing a volume of the second mobile phase required to elute a respective compound of the first effluent at least through a second stationary phase of the second chromatography system, preferably by integrating a value of the second flow rate over time. Alternatively or in addition, the value of the retention volume may be determined by building a sum or cumulative sum of the volume increments delivered since a reference event, e.g. a run start, whereas the said flow rate or volume increments may be obtained from monitoring the fluid drive operation, e.g. piston(s) motion or e.g. by direct monitoring the flow rate of volume movement by means of flow meters or sensors as known in the art. Alternatively or in addition, the value of retention volume may be determined by controlling and/or registering or representing the separation parameters (as e.g. composition) data (as. e.g. detector signals) and events (as e.g. wavelength switching, valve switching, sensitivity switching) in correspondence to the eluent volume delivered since a reference event rather than in correspondence to time.

This allows accelerating the second chromatographic separation with respect to operating the second liquid chromatography system in a time-based control scheme. Such acceleration and thus reduced time required for executing the second chromatographic separation may improve the transfer between the first and second dimension in particular by allowing to increase the number and/or volume of portions of the first effluent to be transferred into the second dimension and/or by allowing to increase a frequency of transfer of portions of the first effluent to be transferred into the second dimension.

In one embodiment, the control unit is configured to operate the second liquid chromatography system to minimise a time required for the second chromatographic separation This can be achieved e.g. by maximizing the second flow rate of the second mobile phase during the second chromatographic separation. Alternatively or in addition, this can be achieved e.g. by operating the second liquid chromatography system substantially continuously or at least mainly during a respective second chromatographic separation (also referred to as a respective second dimension run) at substantially maximum permittable pressure and thus maximizing the second flow rate of the second mobile phase during the second chromatographic separation. Minimizing the time required for the second chromatographic separation can in particular allow the two-dimensional chromatographic separation to be provided in a fully comprehensive mode, i.e. substantially the entire volume of the sample fluid can be separated by both dimensions or enhance operation in such mode.

In one embodiment, the control value is a pressure of the second mobile phase, and the control unit is configured to operate the second liquid chromatography system by maintaining the pressure of the second mobile phase substantially constant during the second chromatographic separation, preferably by maintaining the pressure of the second mobile phase at or in the range of a maximum pressure value representing a maximum value of pressure of the second mobile phase substantially not to be exceeded during the second chromatographic separation. Controlling the pressure rather than the flow rate of the second mobile phase may allow better utilizing the capability of the multidimensional liquid chromatography system for example in the sense of speed of separation (e.g. in that such speed of separation can be increased in particular in the second dimension). Further, controlling the pressure of the second mobile phase to be substantially constant during the second chromatographic separation allows reducing stress on the second liquid chromatography system as resulting from pressure variations, in particular pressure spikes and high-pressure changes over time. In particular chromatographic columns can be sensible to stress from pressure variations which may lead to a reduced lifetime.

In one embodiment, the control unit is configured to operate the first flow rate of the first mobile phase as a function of the second flow rate of the second mobile phase. This allows adapting the first flow rate (in the first liquid chromatography system) to the actual requirements in the second liquid chromatography system.

In one embodiment, the control unit is configured to operate the second liquid chromatography system during the second chromatographic separation according to the control value different from the second flow rate, so that a variation in the control value can lead to a variation in the second flow rate. Alternatively or in addition, the control unit can be configured to operate the second liquid chromatography system during the second chromatographic separation by controlling the control value (or control parameter) different from the second flow rate, so that controlling, regulating, changing or maintaining constant the control value may result in a (or be accomplished by) variation in the second flow rate.

In one embodiment, the control unit is configured to control a transfer of the at least a portion of the first effluent into the second liquid chromatography system.

In one embodiment, the control unit is configured to sequentially transfer individual portions of the first effluent into the second liquid chromatography system, and to operate the second liquid chromatography system to terminate the second chromatographic separation for a respective transferred individual portion of the first effluent before a successive (all subsequent) portion of the first effluent is to be transferred to or separated in the second liquid chromatography system. This allows operating the second liquid chromatography system to match with time constraints and time requirements resulting from the first dimension, e.g. to match with a given frequency and/or volume of the first effluent as dictated for example by a comprehensive mode.

In one embodiment, the control unit is configured to operate the multi-dimensional liquid chromatography system in a heart-cutting mode by controlling to transfer selected portions of the first effluent into the second liquid chromatography system, wherein preferably the selected portions are elected to represent specific segments of interest of the first effluent or its specific portions.

In one embodiment, the control unit is configured to operate the multi-dimensional liquid chromatography system in a comprehensive mode by controlling to transfer (e.g. in portions) substantially (e.g. in multiple aliquots) the entire first effluent, preferably in sequential portions, into the second liquid chromatography system.

In one embodiment, the second liquid chromatography system is configured for chromatographically separating at least a portion of the first effluent comprised in the second mobile phase and to provide a second effluent comprising at least a portion of the separated first effluent.

In one embodiment, the control unit is configured to operate the second liquid chromatography system to be self-controlled with respect to the second flow rate.

In one embodiment, the control value is one of a group comprising: a pressure of or within the second mobile phase, a pressure difference along a second stationary phase of the second liquid chromatography system, a control parameter related to driving the second mobile phase such as one or more of an electrical current, a voltage, and a power (e.g. consumed by the drive) for driving the second mobile phase, a temperature at a certain point within the flow path of the second mobile phase (e.g. at the second column or at the second column's outlet), a measured, guessed, calculated or modelled value of flow rate corresponding to an optimum column efficiency or minimized peak dispersion, and a value related to a viscosity of or within the second mobile phase.

In one embodiment, the first liquid chromatography system comprises a first pumping unit configured for driving the first mobile phase, and a first chromatographic column configured for separating the fluidic sample when comprised within the first mobile phase driven by the first pumping unit In one embodiment, the second liquid chromatography system comprises a second pumping unit configured for driving the second mobile phase, and a second chromatographic column configured for separating the at least a portion of the first effluent when comprised within the second mobile phase driven by the second pumping unit.

An embodiment of the present invention provides a method of multi-dimensional liquid chromatography. The method comprises providing a first chromatographic separation of a sample fluid comprised in a first mobile phase and providing a first effluent comprising at least a portion of the separated sample fluid, by maintaining a first flow rate of the first mobile phase substantially constant during the first chromatographic separation. The method further comprises providing a second chromatographic separation of at least a portion of the first effluent comprised in a second mobile phase, by operating according to a control value different from a second flow rate of the second mobile phase, so that a variation in the control value leads to a variation in the second flow rate.

In one embodiment, the control value is a pressure of the second mobile phase, and the second chromatographic separation is operated by maintaining the pressure of the second mobile phase substantially constant during the second chromatographic separation, preferably by maintaining the pressure of the second mobile phase at or in the range of a maximum pressure value representing a maximum value of pressure of the second mobile phase substantially not to be exceeded during the second chromatographic separation.

In one embodiment, transfer of the first effluent from the first liquid chromatography system into the second liquid chromatography system is provided by the so-called feed injection type, as disclosed e.g. in US2017343520A1 by the same applicant. A flow comprising the first effluent is combined with the flow of the second mobile phase. US2017343520A1 is incorporated by reference herein in its entirety.

In one embodiment, transfer of the first effluent from the first liquid chromatography system into the second liquid chromatography system is provided by the so-called flow-through injection type, as disclosed e.g. in US20160334031A1 by the same applicant. A volume comprising the first effluent is switched into the flow of the second mobile phase. US20160334031A1 is incorporated by reference herein in its entirety.

In one embodiment, transfer of the first effluent from the first liquid chromatography system into the second liquid chromatography system is provided using a so-called "Park deck" configuration with a plurality of selectable buffering volumes, e.g. as disclosed in WO2016016740A1 by the same applicant, allowing to temporarily buffer one of plural portions of the first effluent before transferring to the second liquid chromatography system. WO2016016740A1 is incorporated by reference herein in its entirety.

The term "aliquot" or "sample aliquot" as used herein can be understood as a portion of a fluid (e.g. a fluidic sample), preferably a portion of an effluent (which may be also referred to as "eluate") of a first dimension, which is (or will be) subjected as a whole (i.e. preferably comprising its entire volume) to separation (typically in a second dimension) into one or more fractions thereof.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance biomolecules such as proteins. Since separation of a fluidic sample into fractions involves a certain separation criterion (such as mass, volume, chemical properties, etc.) according to which a separation is carried out, each separated fraction may be further separated by another separation criterion (such as mass, volume, chemical properties, etc.) or finer separated by the first separation criterion, thereby splitting up or separating a separate fraction into a plurality of sub-fractions.

In the context of this application, the term "fraction" may particularly denote such a group of molecules or particles of a fluidic sample which have a certain property (such as mass, charge, volume, chemical properties or interaction, etc.) in common according to which the separation has been carried out. However, molecules or particles relating to one fraction can still have some degree of heterogeneity, i.e. can be further separated in accordance with another separation criterion. As well the term "fraction" may denote a portion of a solvent containing the aforementioned group of molecules.

In the context of this application, the term "sub-fractions" may particularly denote individual groups of molecules or particles all relating to a certain fraction which still differ from one another regarding a certain property (such as mass, volume, chemical properties, etc.). Hence, applying another separation criterion for the second separation as compared to the separation criterion for the first separation allows these groups to be further separated from one another by applying the other separation criterion, thereby obtaining the further separated sub-fractions. As well the term "sub-fraction" may denote a portion of a solvent containing the aforementioned individual group of molecules.

In the context of this application, the term "downstream" may particularly denote that a fluidic member located downstream compared to another fluidic member will only be brought in interaction with a portion of fluid, more specially of the mobile phase, after interaction of the said portion of fluid with the other fluidic member (the said other fluidic member hence being arranged upstream). Therefore, the terms "downstream" and "upstream" relate to a flowing direction of the fluidic sample or generally of the mobile phase. The terms "downstream" and "upstream" may also relate to a preferred direction of the fluid flow between the two members being in downstream-upstream relation.

In the context of this application, the term "sample separation apparatus" may particularly denote any apparatus which is capable of separating different fractions of a fluidic sample by applying a certain separation technique. Particularly, two separation apparatus may be provided (e.g. in the sense of combined, joined, connected, or similar) in such a sample separation apparatus when being configured for a two-dimensional separation. This means that the sample is first separated in accordance with a first separation criterion, and at least one or some of the fractions resulting from the first separation are subsequently separated in accordance with a second, different, separation criterion ore more finely separated in accordance with the first separation criterion.

The term "separation unit" may particularly denote a fluidic member through which a fluidic sample is transferred (e.g. in the sense of transported, transfused, or similar), and which is configured so, that, upon conducting the fluidic sample through the separation unit, the fluidic sample will be separated into different groups of molecules or particles (called fractions or sub-fractions, respectively). An example for a separation unit is a liquid chromatography column which is capable of trapping or retarding and selectively releasing different fractions of the fluidic sample.

In the context of this application, the term "fluid drive" may particularly denote any kind of pump which is configured for forcing a flow of mobile phase and/or a fluidic sample along a fluidic path. A corresponding liquid supply system may be configured for delivery of a single liquid or of two or more liquids in controlled proportions and for supplying a resultant mixture as a mobile phase. It is possible to provide a plurality of solvent supply lines, each fluidically connected with a respective reservoir containing a respective liquid, a proportioning valve interposed between the solvent supply lines and the inlet of the fluid drive, the proportioning valve configured for modulating solvent composition by sequentially coupling selected ones of the solvent supply lines with the inlet of the fluid drive, wherein the fluid drive is configured for taking in liquids from the selected solvent supply lines and for supplying a mixture of the liquids at its outlet. More particularly, the first fluid drive can be configured to drive the fluidic sample, usually mixed with, or injected into a flow of a mobile phase (solvent composition), through the first-dimension separation apparatus, whereas the second fluid drive can be configured for driving the fluidic sample fractions (for example, which may contain an amount of the first mobile phase as result of treatment by the first-dimension separation unit within a flow of the first mobile phase), usually mixed with a further mobile phase (solvent composition), after treatment by the first-dimension separation unit through the second-dimension separation apparatus.

In the context of this application, the term "buffer" or "buffering" may particularly be understood as temporarily storing. Accordingly, the term "buffering fluid" is preferably understood as temporarily storing an amount of fluid, which may later be fully or partly retrieved from such unit buffering the fluid.

In the context of this application, the term "loop" may particularly be understood as a fluid conduit allowing to temporarily store an amount of fluid, which may later be fully or partly retrieved from the loop. Preferably, such loop has an elongation along the flow direction of the fluid and a limited mixing characteristic (e.g. resulting from diffusion), so that a spatial variation in composition in the fluid will be at least substantially maintained along the elongation of the loop. Accordingly, the term "sample loop" may be understood as a loop configured to temporarily store an amount of sample fluid. Further accordingly, a sample loop is preferably configured to at least substantially maintain a spatial variation in the sample fluid (along the flow direction of the sample), as e.g. resulting from a previous chromatographic separation of the sample fluid, during temporarily storing of such sample fluid.

In the context of this application, the term "couple", "coupled", or "fluidically coupled" may particularly be understood as providing a fluidic connection at least during a desired time interval. Such fluidic connection may not be permanent but allows an essentially unconstrained flow of fluid in at least one direction (e.g. a passive transport of fluid between the components fluidically coupled to each other) at least during such desired time interval. Accordingly, fluidically coupling may involve active and/or passive components, such as one or more fluid conduits, switching elements (such as valves), active switching valves or elements thereof, check valves, et cetera.

In one embodiment, a pressure of the first mobile phase and/or the second mobile phase is at least 400 bar, particularly of at least 1000 bar, and more particularly of at least 2000 bar.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs. The illustration in the drawings is schematic.

DETAILED DESCRIPTION

According to an exemplary embodiment of the invention, a two-dimensional liquid chromatography (2D-LC) system is provided for precise and reliable two-dimensional separations.

Figure 1:
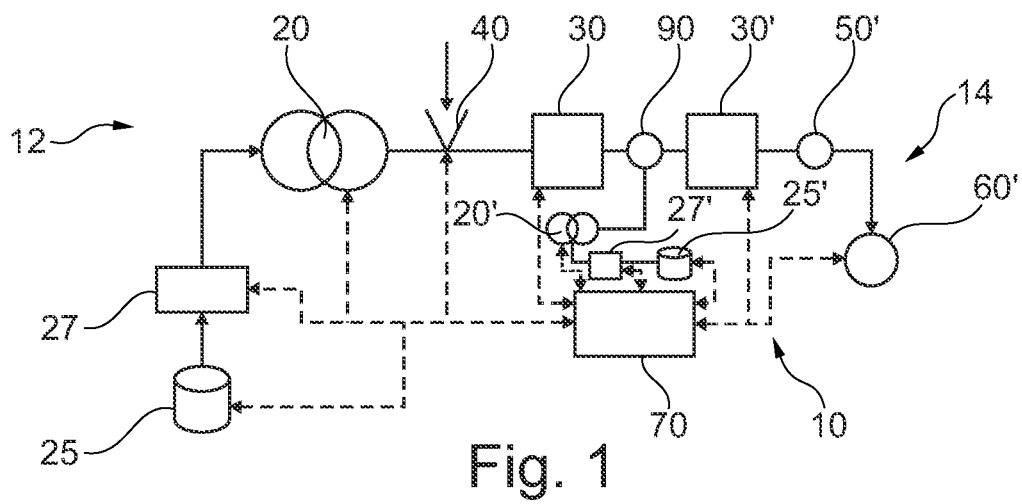
FIG. 1 illustrates a liquid chromatography system according to an exemplary embodiment.

Referring now in greater detail to the drawings, FIG. 1 depicts a general schematic of a two-dimensional liquid separation system 10 comprising a first liquid chromatography system 12 and a second liquid chromatography system 14. The first liquid chromatography system 12 comprises a first pump 20 which receives a first mobile phase (also denoted as fluid) as a whole or as individual components that get mixed together by the first pump 20, from a first solvent supply 25, typically via a first degasser 27, which degases and thus reduces the amount of dissolved gases in the first mobile phase. The first pump 20—as a first mobile phase drive—drives the first mobile phase (at a first flow rate) through a first separating device 30 (such as a chromatographic column) comprising a stationary phase. A sampling unit 40 can be provided between the first pump 20 and the first separating device 30 in order to subject or add (often referred to as sample introduction or injection) a sample fluid (also denoted as fluidic sample) into the first mobile phase. The stationary phase of the first separating device 30 is configured for separating compounds of the sample liquid. Not shown in FIG. 1 is an optional detector 50 coupled between the first separating device 30 and a modulation assembly 90, which is provided for detecting compounds of the sample fluid separated by the first separating device 30. An optional fractionating unit 60 (not shown in the Figures) may be provided downstream from the first separating device 30 and/or the detector 50 for collecting separated compounds of sample fluid.

The second liquid chromatography system 14 comprises a second pump 20' which receives a second mobile phase (also denoted as fluid) from a second solvent supply 25', typically via a second degasser 27', which degases and thus reduces the amount of dissolved gases in the second mobile phase. The second pump 20'—as a second mobile phase drive—drives the second mobile phase (at a second flow rate) through a second separating device 30' (such as a chromatographic column) comprising a stationary phase.

The first liquid chromatography system 12 provides a first chromatographic separation of the sample fluid (when comprised in the first mobile phase) in a first dimension and shall comprise and be referred to by reference numerals 20, 30, . . . , et cetera. The second liquid chromatography system 14 provides a second chromatographic separation of the effluent from the first dimension (when comprised in the second mobile phase) in a second dimension and shall comprise and be referred to by reference numerals 20', 30', . . . , et cetera.

The modulation assembly 90 couples the first dimension of the first liquid chromatography system 12 to the second dimension of the second liquid chromatography system 14 (of the two-dimensional liquid chromatography system 10 of FIG. 1) by taking one or plural aliquots of the effluent from the first liquid chromatography system 12 and transferring such one or plural aliquots into the second liquid chromatography system 14 (for further chromatographic separation). Accordingly, the modulation assembly 90 can be assumed as belonging to both the first liquid chromatography system 12 and the second liquid chromatography system 14. The fluidic sample is separated into multiple fractions by the first dimension, and each fraction is further separated into multiple sub-fractions by the second dimension.

A detector 50' is provided for detecting separated compounds of the sample fluid. A fractionating unit 60' can be provided for collecting separated compounds of sample fluid.

While each of the (first and second) mobile phases can be comprised of one solvent only, it may also be mixed from plural solvents. Such mixing might be a low pressure mixing and provided upstream of the pumps 20, 20', so that the respective pump 20, 20' already receives and pumps the mixed solvents as the mobile phase. Alternatively, each pump 20, 20' might be comprised of plural individual pumping units, with plural of the pumping units each receiving and pumping a different solvent or mixture, so that the mixing of the mobile phase (as received by the respective separating device 30, 30') occurs at high pressure and downstream of the pump 20, 20' (or as part thereof). Alternatively, the pumps 20, 20' may internally mix or proportionate multiple solvents and then pump the mixture into the system. The composition of the mobile phase may be kept constant over time, the so-called isocratic mode, or varied over time, the so-called gradient mode.

A data processing unit 70, also referred to as control unit, which can be a conventional PC or workstation, also a tablet smartphone or embedded processing system, might be coupled (as indicated by the dotted arrows) to one or more of the devices in the liquid separation system 10 in order to receive information and/or control operation. For example, the data processing unit 70 might control operation of the pump 20, 20' (for instance setting control parameters) and receive therefrom information regarding the actual working conditions (such as output pressure, flow rate, etc.). The data processing unit 70 might also control operation of the solvent supply 25, 25' (for instance setting the solvent/s or solvent mixture to be supplied) and/or the degasser 27, 27' (for instance setting control parameters such as vacuum level) and might receive therefrom information regarding the actual working conditions (such as solvent composition supplied over time, flow rate, vacuum level, etc.). The data processing unit 70 might further control operation of the sampling unit 40 (for instance controlling sample injection or synchronizing sample injection with operating conditions of the pump 20). The respective separating device 30, 30' might also be controlled by the data processing unit 70 (for instance selecting a specific flow path or column, setting operation temperature, etc.), and send—in return—information (for instance operating conditions) to the data processing unit 70. Accordingly, the detector 50 might be controlled by the data processing unit 70 (for instance with respect to spectral or wavelength settings, setting time constants, start/stop data acquisition), and send information (for instance about the detected sample compounds) to the data processing unit 70. The data processing unit 70 might also control operation of the fractionating unit 60 (for instance in conjunction with data received from the detector 50) and provide data back.

It is to be understood that the data processing unit 70 is a schematic representation and not necessarily a physical unit. The data processing unit 70 may be distributed or have parts in other modules, e.g. the pump 20 and/or 20', et cetera.

In an embodiment according to the present invention, sample separation in the first dimension (i.e. provided by the first pump 20, the first separating device 30, et cetera) of the 2D-LC system shown in FIG. 1 is provided by a time-based control scheme, i.e. a first flow rate of the first mobile phase in the first dimension is kept substantially constant or is operated to follow a certain program, allowing to determine a retention time for each separated fraction as a time required to be eluted by the (first dimension) first mobile phase through the separating device 30. In the second dimension (i.e. provided by the second pump 20', the second separating device 30', et cetera), however, operation is performed in accordance with a volume-based control scheme, e.g. as outlined in the aforementioned WO2009062538A1. Hence, the separation of the fractions and sub-fractions of the fluidic sample in the second dimension is performed in terms of delivered or run volumes rather than in terms of time slices.

According to embodiments of the present invention, the second flow rate of the second mobile phase can be controlled in dependence on a control value related e.g. to a pressure in the second mobile phase, thus implying possible variations of the flow rate, resulting from control on the control value (e.g. pressure), whereas the programmed composition dependency on the delivered solvent volume (run volume) is maintained invariant. For that purpose, the second dimension can be designed to be essentially self-controlled or free-wheeling, so that a variation e.g. fluid viscosity or system permeability/restriction "automatically" leads to a variation in the second flow rate. This can be achieved e.g. by (passively) operating the second pump 20' to be free-wheeling, so that the second pump 20' is running at a given power (e.g. maximum power). In such case, a variation in the second mobile phase pressure will in turn lead to a variation in the second flow rate. For example when the pressure decreases, the free-wheeling second pump 20' will then increase speed and thus the second flow rate, as it can then run faster at the same power consumption.

The second pump 20' can be operated to reduce the second flow rate in response to an increase of the control value, and to increase the second flow rate in response to a decrease of the control value. Such reduction and increase of the second flow rate can be in relation to a given value of the second flow rate, such as a defined second flow rate value for a certain type of chromatographic column 30'.

The data processing unit 70 receives the control value, which is or is related e.g. to a pressure in the mobile phase. While the control value is preferably an actually measured value, such as the pressure (e.g. by any kind of pressure sensor known in the art—not shown in the Figures), in the mobile phase, it is to be understood that any other parameter showing a dependency on a mobile phase property can serve as such control value when used to control the flow rate. Examples can be a pressure difference e.g. along the column 30' or a value related to a viscosity of second the mobile phase.

Alternatively, the control value can be derived from a control parameter of the second pump 20' such as an electrical current, voltage and power for driving the second pump 20'. A variation in current, voltage or power for driving the second pump 20' is usually indicative of the load of the second pump 20' or in other words of the pressure drop required for driving the mobile phase through the stationary phase in the separating device 30'.

As the second mobile phase is "distributed" and also varies (e.g. in pressure) all along the second dimension of the HPLC system 10, there are many options with respect to the location at which the control value is related. Such location can be an outlet of the second pump 20', and injection point of the sampling unit 40, an entrance area of the column 20', preferably the head of column, an exit area of the column 20', etc. or combinations thereof.

In a preferred embodiment, the data processing unit 70 operates the second pump 20' to maintain the control value to be substantially constant or at least within a given range, so that the second pump 20' will deliver the second mobile phase at a certain pressure, such as e.g. the maximum achievable pressure of the second pump 20' with or without a certain safety margin. Such operating at a constant/maximum pressure, in turn, can lead to reduced analysis times, in particular when running in a gradient mode, i.e. when composition of the second mobile phase varies over time. Generally in gradient mode, the mobile phase comprises different solvent components with the ratio of the different solvent components being varied over time or, to be more precise, over delivered solvent volume, also referred to run volume, or over an imaginary time, which would correspond to the same (as actual) run volume if it were delivered with a constant or programmed controlled flow rate When operating the second pump 20' to provide a substantially constant output pressure, a reduction in viscosity—in turn—results in increasing the second flow rate, thus leading to shorter separation times.

Figure 2A:
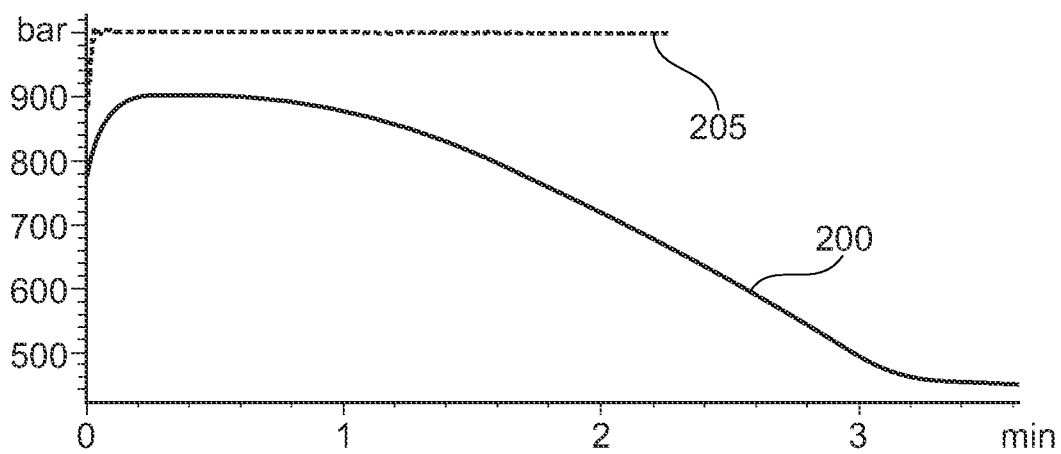
FIG. 2A shows an exemplary comparison of constant flow mode and constant pressure mode, in the context of a plot of pressure over time, based on data acquired from a chromatographic separation.

FIGS. 2A-2D show exemplary comparisons of the very same chromatographic separation either in constant flow mode or in constant pressure mode. FIG. 2A shows an exemplary course of pressure over time, with graph 200 illustrating the constant flow mode and graph 205 illustrating the constant pressure mode. After some initial settling time, the pressure in graph 205 remains substantially constant at about thousand bar during constant pressure mode. In contrast thereto, the pressure of graph 200 following the constant flow mode varies over time, in particular dependent on a variation of eluent viscosity over time.

Figure 2B:
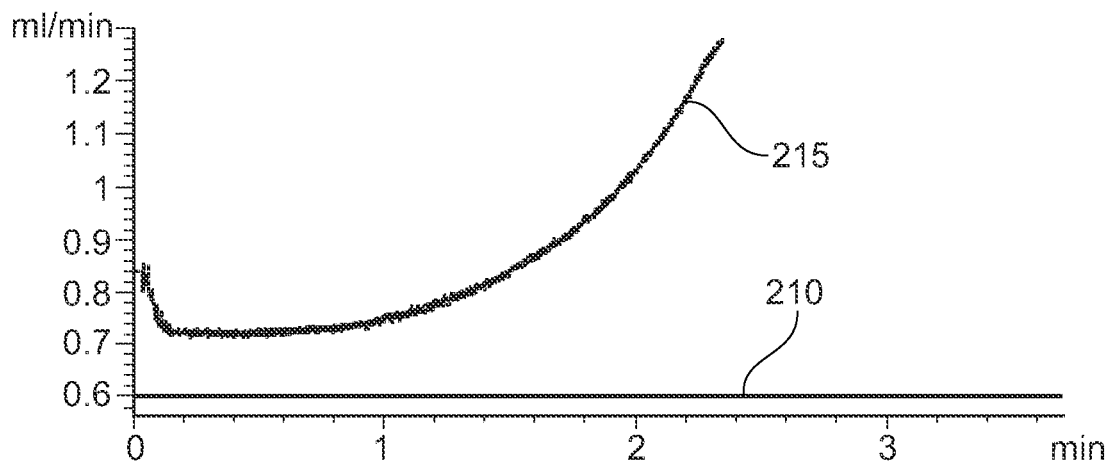
FIG. 2B shows an exemplary comparison of constant flow mode and constant pressure mode, in the context of a plot of flow rate over time, corresponding to the same chromatographic separation as pertains to FIG. 2A.

FIG. 2B shows an exemplary course of flow rate over time corresponding to the course of pressure in FIG. 2A. Graph 210 demonstrates the constant flow mode wherein the flow rate is substantially at constant level. Graph 215 demonstrates the constant pressure mode wherein the flow rate is varying over time (in particular dependent on a variation of eluent viscosity over time).

Figure 2C:
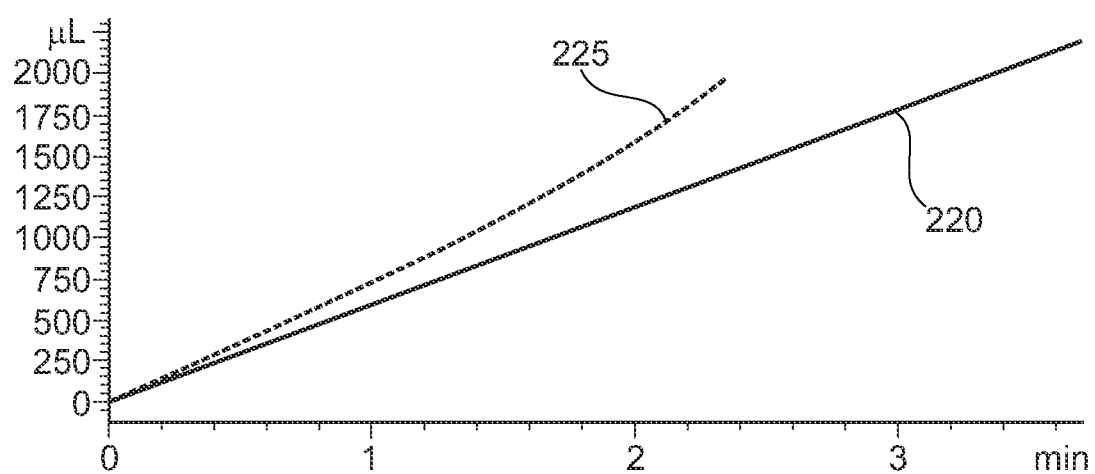
FIG. 2C shows an exemplary comparison of constant flow mode and constant pressure mode, in the context of a plot of run volume over time, corresponding to the same chromatographic separation as pertains to FIG. 2A.

FIG. 2C shows an exemplary course of run volume over time corresponding to the course of pressure in FIG. 2A as well as the course of flow rate in FIG. 2B. Graph 220 demonstrates the constant flow mode, while graph 225 demonstrates the constant pressure mode. The increasing flow rate over time in the constant pressure mode results in that the run volume is growing over-proportionally to time as opposed to direct proportionality between run volume and time in constant flow mode. Also, a specific run volume value is reached earlier in the constant pressure mode, because in the given example the average flow rate is higher in this case.

Figure 2D:
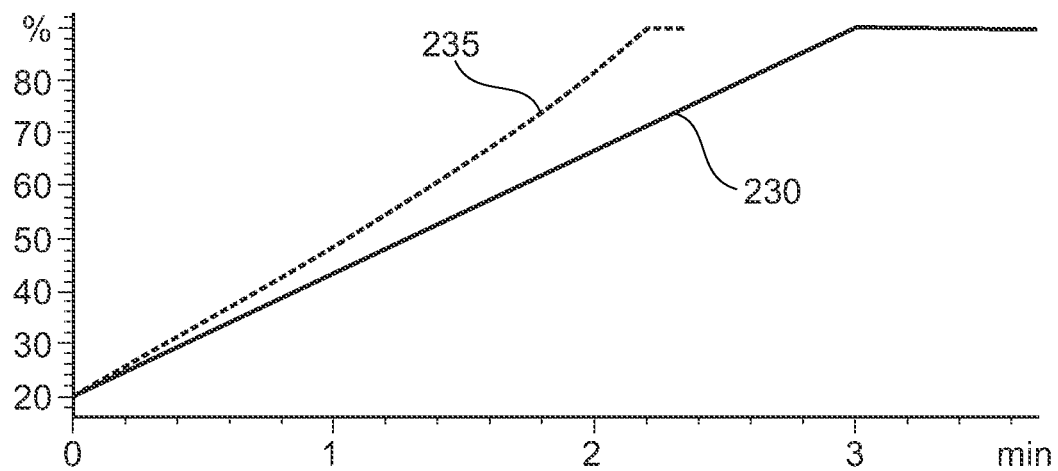
FIG. 2D shows an exemplary comparison of constant flow mode and constant pressure mode, in the context of a plot of percentage of solvent B in a solvent mixture of solvents A and B over time, corresponding to the same chromatographic separation as pertains to FIG. 2A.

FIG. 2D shows an exemplary course of % B ramp (percentage of solvent B in a solvent mixture of solvents A and B) over time corresponding to the course of pressure in FIG. 2A, the course of flow rate in FIG. 2B, and the course of run volume over time in FIG. 2C. Graph 230 demonstrates the constant flow mode, while graph 235 demonstrates the constant pressure mode. This graphic illustrates that the composition trace, which is programmed to be linear over time in conventional constant flow operation mode, is no longer linear over time in the constant pressure operation mode but rather follows the course of the run volume over time, as per principle of the Volume Based operation mode.

In the example of FIGS. 2A-2D, while the chromatographic separation in the constant flow mode requires 3.6 minutes, the very same chromatographic separation in constant pressure mode only takes 2.4 minutes.

According to embodiments of the present invention, the second pump 20' is operated at constant pressure, preferably at a maximum pressure permittable for the second liquid chromatography system 14 or the involved parts of the modulation device 90, thus following the 205 in FIG. 2A. Accordingly, the second flow rate does not remain constant within a 2D-run but basically follows a pattern as shown by the course 215 in FIG. 2B.

The data processing unit 70 may determine a value of a retention volume representing such volume of the mobile phase required to elute a respective compound of the sample fluid through the separating device. The second pump 20' is then operated (e.g. by the data processing unit 70 or by being operated to be free-wheeling) according to the determined value of the retention volume, meaning that the analytical run is stopped when at least a certain volume is passed.

In order to determine a specific value of retention volume, the data processing unit 70 may receive certain internal data (such as current flow rate, control value, temperature, solvent composition, and integral volume) from the components of the system 10. It is clear that in many cases the more data the data processing unit 70 receives the more accurate the retention volume can be determined. The second pump 20' may generate a pressure trace for monitoring together with the values of flow rate and other relevant information, e.g. solvent composition, integral volume. Analytical data from the second column 30' can be added, such as retention factor and elution strength across solvent composition. The data processing unit 70 can then consider such additional traces to adapt to run-time conditions and correct for changes.

The data processing unit 70 may combine individual data for e.g. absorbance (as received from the detector 50') and flow (as received from the second pump 20') into a one-dimensional structure. The absorbance vs. time can be combined with flow vs. time to form a trace for absorbance vs. volume. Assuming an artificial but constant flow value, the data processing unit 70 can "back-translate" such absorbance vs. volume into absorbance vs. artificial, so called chromatographic time corresponding to the theoretical case that the system were operated at that artificial constant flow rate.

Figure 3A:
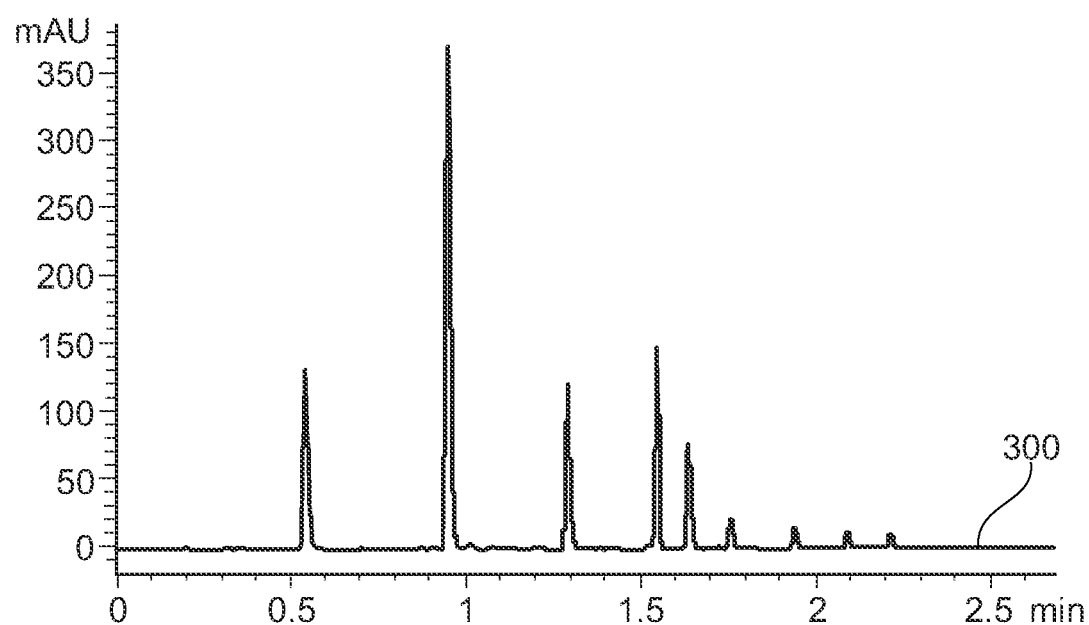
FIG. 3A illustrates signal transformation from real-time coordinates into run volume coordinates, in the context of a chromatogram, in particular a plot of UV-Detector signal (Y-Axis) vs. real time (X-axis).
Figure 3B:
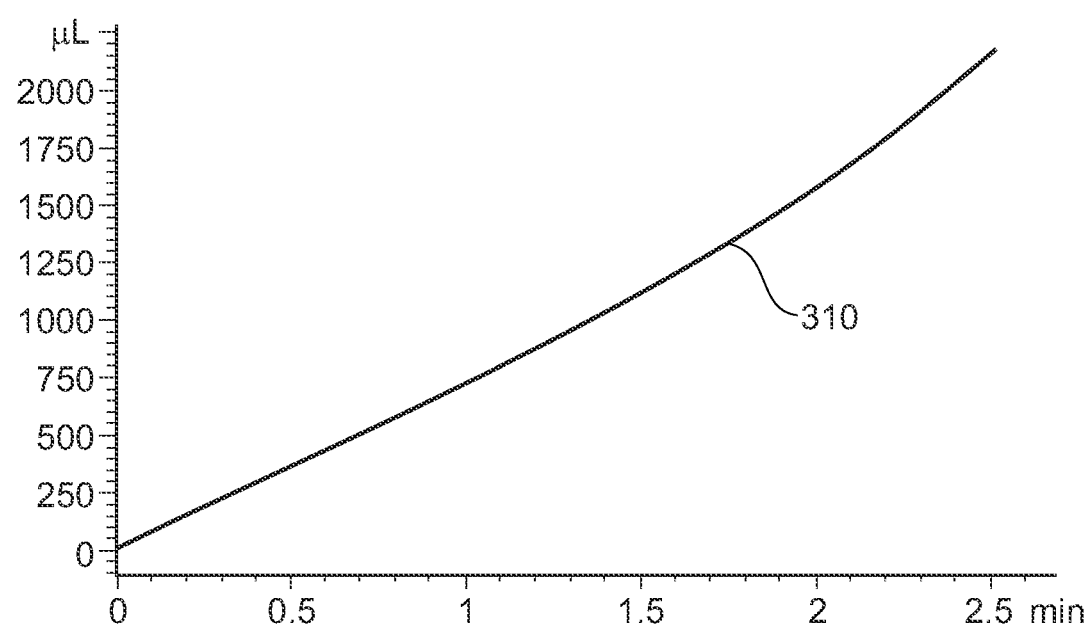
FIG. 3B shows run volume vs. real time corresponding to the same chromatogram as pertains to FIG. 3A.
Figure 3C:
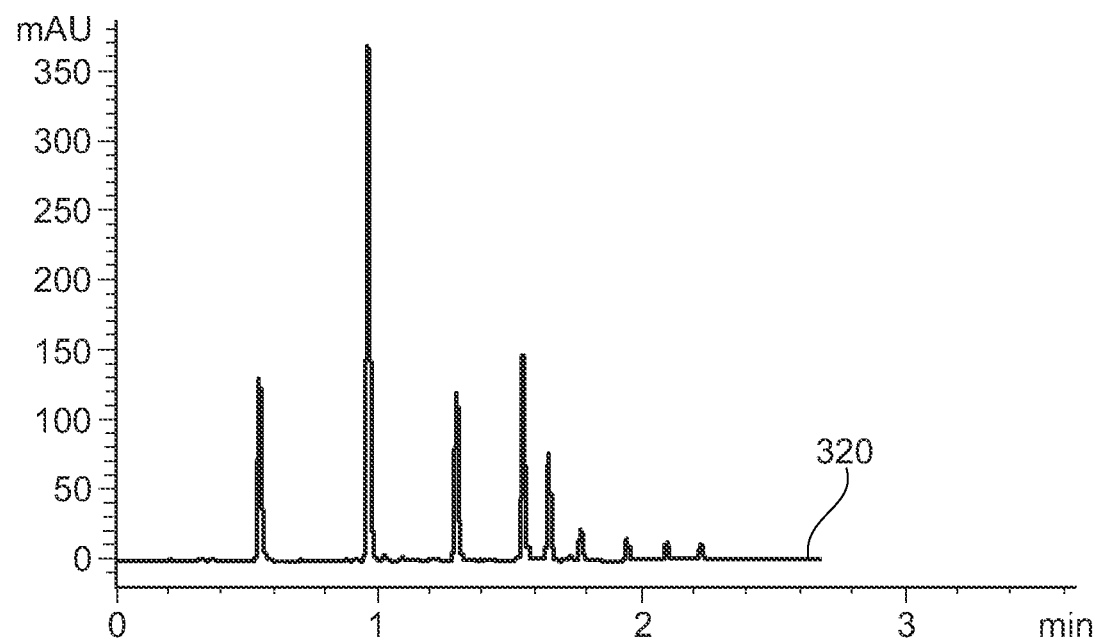
FIG. 3C shows the same chromatogram as shown in FIG. 3A, presented for comparison to FIG. 3D.
Figure 3D:
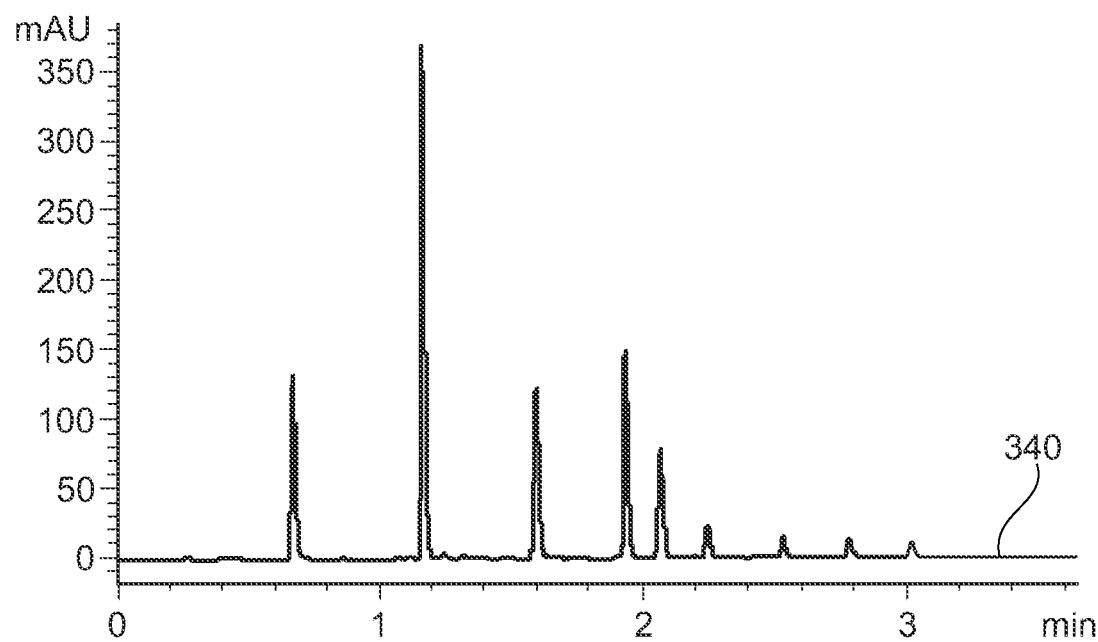
FIG. 3D shows a representation of the chromatogram of FIG. 3A or 3C vs. artificial chromatographic time.

FIGS. 3A-3D illustrate signal transformation from real-time coordinates into run volume coordinates. FIG. 3A shows a UV-Detector signal (Y-Axis) of a chromatogram 300 represented vs. real time (X-axis). FIG. 3B shows run volume vs. real time for this chromatogram course 310. FIG. 3C again shows the UV-Detector signal (Y-Axis) same as FIG. 3A vs. real time, curve 320, whereas FIG. 3D (curve 340) shows the representation of the chromatogram 300, 320 vs artificial chromatographic time, corresponding to a theoretical constant flow rate of 0.6 ml/min. This transformation from real time axis to artificial chromatographic time axis can be done by assigning a single point of the chromatographic time axis to each point of the real time axis (during a run execution) according to the following rule:

$$t_c(t_{real}) = \frac{V_{run}(t_{real})}{FR_{art}},$$

where $t_c(t_{real})$ is a chromatographic time value corresponding to the point $t_{real}$ of the real time axis, $V_{run}(t_{real})$ is the value of run volume in the moment of time $t_{real}$ and $FR_{art}$ is the artificial flow rate.

Turning back to the schematic embodiment of FIG. 1, in an alternative application to running the second-dimension separation in constant pressure mode, the second flow rate is allowed to be freewheeling, i.e. not forced to follow a pre-defined program, but rather resulting from the pressure being controlled or regulated (preferably by continuous flow rate adjustment) to follow a pre-defined program, e.g. to be kept constantly equal to a pre-set value. Thus, the second dimension system can be operated continuously at a pressure limit dictated by hardware properties or other factors, rather than being set-up to approach the pressure limit only once during the entire analysis or once during a 2D-run (at the moment of highest fluid viscosity in the flow path), running all the other time at a pressure below a permittable maximum and using the throughput potential of the instrumentation incompletely.

In one embodiment, the data processing unit 70 (the control unit) controls the modulation assembly 90 to sequentially transfer individual portions of the first effluent (from the first-dimension separation system) into the second-dimension separation system. The second pump 20' is controlled to operate in a constant pressure mode, and each individual separation process in the second dimension is provided at a respective pressure value (which is to be maintained constant during the second-dimension separation). The data processing unit 70 has knowledge about the time interval between each transfer of individual portions of the first effluent into the second dimension, and operates the second pump 20' at a respective pressure value sufficient to terminate the second chromatographic separation for the respective transferred individual portion of the first effluent before a successive portion of the first effluent is to be transferred into the second dimension separation. In other words, the pressure of the second mobile phase (as provided by the second pump 20') can be determined and/or selected (by the data processing unit 70) for each run of separation in the second dimension, so that such run can be terminated before a next run is to be started. In an embodiment the pressure at which the second dimension is operated is chosen same for all second-dimension runs within an analysis (comprising a single first-D separation and all second-D separations of the aliquots resulting from the said first-D separation).

The pressure of the second mobile phase can be selected individually for each individual run of separation in the second dimension, e.g. by setting such pressure to a minimum value required to terminate such run before a next one is to be started. This can allow to reduce stress on the second separating device 30' as resulting from high pressure application. This may be in particular advantageous in case of multi-heart cutting mode. Alternatively, the pressure of the second mobile phase can be selected for each run (of separation in the second dimension) to a maximum applicable pressure, allowing to ensure that each run is executed within the shortest possible timeframe. This may be in particular advantageous in case of comprehensive mode allowing to minimize the runtime in the second dimension and thus allowing to maximize the sampling frequency in the first dimension.

Alternatively, the pressure can be set same to all run in the second dimension, either such that the most time-critical run still gets executed in time (e.g. to reduce stress) or to an absolute permittable maximum, in order to maximize the analysis speed. Still alternatively, the pressure can be set to an intermediate value, e.g. to finish the second-D runs more or less simultaneously with the first-D separation, such that the second dimension does not elongate the analysis, and at the same time the stress on the system is minimized.

In embodiments, not shown in the Figures, the modulation assembly 90 may comprise a plurality of storage volumes each allowing to temporarily store an amount of fluid such as a portion of the effluent from the first dimension. This may be achieved by usage of a so-called "Park deck" assembly as disclosed e.g. in aforementioned WO2016016740A1, or in DE102013212540A1 by the same applicant. DE102013212540A1 is incorporated by reference herein in its entirety. This can allow accommodating for the time requirements in the transfer between the first and second dimension, e.g. in case the maximum possible pressure in the second dimension (i.e. of the second mobile phase as provided by the second pump 20') would not be sufficient to securely terminate a respective run in the second dimension before a successive run in the second dimension needed to be started. Alternatively or in addition, this may be useful in case analytical demands or constraints in the second dimension would not allow to securely terminate a respective run in the second dimension before a successive aliquot must be isolated from the effluent stream of the first dimension. There might be other constraints as well, e.g. it just might not be possible to achieve a required resolution in the second dimension, if the flow rate is too high; in this case the optimum operation might be achieved not at maximum pressure (i.e. being limited by pump capability), but rather at a pressure or flow rate dictated by another factor, e.g. chromatographic properties of the sample. In scope of this invention constant pressure operation mode can be used for reducing stress to the system, also by operating the system not at maximum pressure.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the control unit 70 schematically depicted in FIG. 1. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), field-programmable gate arrays (FPGAs), or application specific integrated circuits (ASICs). Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the control unit 70 schematically depicted in FIG. 1), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

The invention claimed is:

1. A multi-dimensional liquid chromatography system, comprising:
a first liquid chromatography system configured for providing a first chromatographic separation of a sample fluid comprised in a first mobile phase and to provide a first effluent comprising at least a portion of the separated sample fluid,
a second liquid chromatography system configured for providing a second chromatographic separation of at least a portion of the first effluent comprised in a second mobile phase, and
a control unit configured to operate the first liquid chromatography system by maintaining a first flow rate of the first mobile phase substantially constant during the first chromatographic separation, and to operate the second liquid chromatography system during the second chromatographic separation according to a control value different from a second flow rate of the second mobile phase.

2. The multi-dimensional liquid chromatography system of claim 1, wherein:
the control unit is configured to operate the first liquid chromatography system in a time-based control scheme by determining a value of a retention time representing a time required to elute a respective compound of the sample fluid through a first stationary phase of the first liquid chromatography system.

3. The multi-dimensional liquid chromatography system of claim 1, wherein:
the control unit is configured to operate the second liquid chromatography system in a volume-based mode by determining a value of a retention volume representing a volume of the second mobile phase required to elute a respective compound of the first effluent at least through a second stationary phase of the second chromatography system.

4. The multi-dimensional liquid chromatography system of claim 1, comprising one of:
the control unit is configured to operate the second liquid chromatography system to minimize a time required for the second chromatographic separation;
the control unit is configured to operate the second liquid chromatography system to minimize a time required for the second chromatographic separation, by maximizing the second flow rate of the second mobile phase during the second chromatographic separation.

5. The multi-dimensional liquid chromatography system of claim 1, comprising one of:
the control value is a pressure of the second mobile phase, and the control unit is configured to operate the second liquid chromatography system by maintaining the pressure of the second mobile phase substantially constant during the second chromatographic separation;
the control value is a pressure of the second mobile phase, and the control unit is configured to operate the second liquid chromatography system by maintaining the pressure of the second mobile phase substantially constant during the second chromatographic separation, by maintaining the pressure of the second mobile phase at or in the range of a maximum pressure value representing a maximum value of pressure of the second mobile phase substantially not to be exceeded during the second chromatographic separation.

6. The multi-dimensional liquid chromatography system of claim 1, comprising at least one of:
the control unit is configured to operate the first flow rate of the first mobile phase as a function of a second flow rate of the second mobile phase;
the control unit is configured to operate the second liquid chromatography system during the second chromatographic separation according to the control value different from the second flow rate, so that a variation in the control value can lead to a variation in the second flow rate.

7. The multi-dimensional liquid chromatography system of claim 1, wherein:
the control unit is configured to control a transfer of the at least a portion of the first effluent into the second liquid chromatography system.

8. The multi-dimensional liquid chromatography system of claim 1, wherein:
the control unit is configured to sequentially transfer individual portions of the first effluent into the second liquid chromatography system, and to operate the second liquid chromatography system to terminate the second chromatographic separation for a respective transferred individual portion of the first effluent before a successive portion of the first effluent is to be transferred to or separated in the second liquid chromatography system.

9. The multi-dimensional liquid chromatography system of claim 1, comprising one of:
the control unit is configured to operate the multi-dimensional liquid chromatography system in a heart-cutting mode by controlling to transfer selected portions of the first effluent into the second liquid chromatography system;
the control unit is configured to operate the multi-dimensional liquid chromatography system in a heart-cutting mode by controlling to transfer selected portions of the first effluent into the second liquid chromatography system, wherein the selected portions are elected to represent specific segments of interest of the first effluent.

10. The multi-dimensional liquid chromatography system of claim 1, comprising one of:
the control unit is configured to operate the multi-dimensional liquid chromatography system in a comprehensive mode by controlling to transfer substantially the entire first effluent into the second liquid chromatography system;
the control unit is configured to operate the multi-dimensional liquid chromatography system in a comprehensive mode by controlling to transfer substantially the entire first effluent, in sequential portions, into the second liquid chromatography system.

11. The multi-dimensional liquid chromatography system of claim 1, comprising at least one of:
the second liquid chromatography system is configured for chromatographically separating at least a portion of the first effluent comprised in the second mobile phase and to provide a second effluent comprising at least a portion of the separated first effluent;
the control unit is configured to operate the second liquid chromatography system to be self-controlled with respect to the second flow rate;
the control value is selected from the group consisting of: a pressure of or within the second mobile phase; a pressure difference along a second stationary phase of the second liquid chromatography system; a control parameter related to driving the second mobile phase; an electrical current; a voltage; a power for driving the second mobile phase; a temperature at a certain point within the flow path of the second mobile phase; a measured, guessed, calculated or modeled value of flow rate corresponding to an optimum column efficiency or minimized peak dispersion; and a value related to a viscosity of or within the second mobile phase.

12. The multi-dimensional liquid chromatography system of claim 1, comprising at least one of:
the first liquid chromatography system comprises a first pumping unit configured for driving the first mobile phase, and a first chromatographic column configured for separating the fluidic sample when comprised within the first mobile phase driven by the first pumping unit;
the second liquid chromatography system comprises a second pumping unit configured for driving the second mobile phase, and a second chromatographic column configured for separating the at least a portion of the first effluent when comprised within the second mobile phase driven by the second pumping unit.

13. A method of multi-dimensional liquid chromatography, the method comprising:
operating a first liquid chromatography system to provide a first chromatographic separation of a sample fluid comprised in a first mobile phase and provide a first effluent comprising at least a portion of the separated sample fluid, by maintaining a first flow rate of the first mobile phase substantially constant during the first chromatographic separation, and
operating a second liquid chromatography system to provide a second chromatographic separation of at least a portion of the first effluent comprised in a second mobile phase, by operating according to a control value different from a second flow rate of the second mobile phase.

14. The method of claim 13, wherein:
the control value is a pressure of the second mobile phase, and
the second chromatographic separation is operated by maintaining the pressure of the second mobile phase substantially constant during the second chromatographic separation.

15. The method of claim 14, wherein the maintaining the pressure of the second mobile phase substantially constant during the second chromatographic separation comprises maintaining the pressure of the second mobile phase at or in the range of a maximum pressure value representing a maximum value of pressure of the second mobile phase substantially not to be exceeded during the second chromatographic separation.

16. A non-transitory computer-readable medium, comprising instructions stored thereon, that when executed on a processor, control or perform the steps of the method of claim 13.

* * * * *